(12) United States Patent
Son

(10) Patent No.: US 10,852,575 B2
(45) Date of Patent: Dec. 1, 2020

(54) DISPLAY APPARATUS HAVING FRONT COVER WITH INFRARED SENSOR

(71) Applicant: LG ELECTRONICS INC., Seoul (KR)

(72) Inventor: Heeseung Son, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 112 days.

(21) Appl. No.: 16/305,744

(22) PCT Filed: Jun. 22, 2016

(86) PCT No.: PCT/KR2016/006615
§ 371 (c)(1),
(2) Date: Nov. 29, 2018

(87) PCT Pub. No.: WO2017/209338
PCT Pub. Date: Dec. 7, 2017

(65) Prior Publication Data
US 2020/0233256 A1  Jul. 23, 2020

(30) Foreign Application Priority Data
May 31, 2016 (KR) .................. 10-2016-0067351

(51) Int. Cl.
*G02F 1/1333* (2006.01)
*G02F 1/1335* (2006.01)

(52) U.S. Cl.
CPC ...... *G02F 1/133308* (2013.01); *G02F 1/1335* (2013.01); *G02F 1/13338* (2013.01)

(58) Field of Classification Search
CPC ............. G02F 1/133308; G02F 1/1335; G02F 1/13338
See application file for complete search history.

(56) References Cited

U.S. PATENT DOCUMENTS

2009/0153438 A1* 6/2009 Miller .................. G06F 3/0488
345/55
2011/0007033 A1* 1/2011 Choi .................. G02F 1/13338
345/175
(Continued)

FOREIGN PATENT DOCUMENTS

| KR | 10-2010-0027417 A | 3/2010 |
| KR | 10-2012-0043365 A | 5/2012 |
| KR | 10-2012-0072095 A | 7/2012 |

(Continued)

*Primary Examiner* — Donald L Raleigh
(74) *Attorney, Agent, or Firm* — Birch, Stewart, Kolasch & Birch LLP

(57) ABSTRACT

A display device is disclosed. The display device includes a display panel, a front cover including a front part shielding an edge area of a front surface of the display panel and a side part shielding a side surface of the display panel, a mounting hole being formed on the side part, a guide panel positioned between the display panel and the front cover and coupled to the side surface of the display panel, a backlight unit positioned at a rear surface of the display panel, a frame positioned at a rear surface of the backlight unit, and an infrared sensor inserted into the mounting hole. The present disclosure can provide an apparently neat display device by positioning the infrared sensor inside the display device.

14 Claims, 17 Drawing Sheets

(56) References Cited

U.S. PATENT DOCUMENTS

2014/0291527 A1\* 10/2014 Okudo .................. G01J 5/0831
250/353
2017/0108733 A1\* 4/2017 Jun .................. G02F 1/133308

FOREIGN PATENT DOCUMENTS

| KR | 10-2016-0003499 A | 1/2016 |
| KR | 10-1612868 B1 | 4/2016 |

\* cited by examiner

【Figure 1】
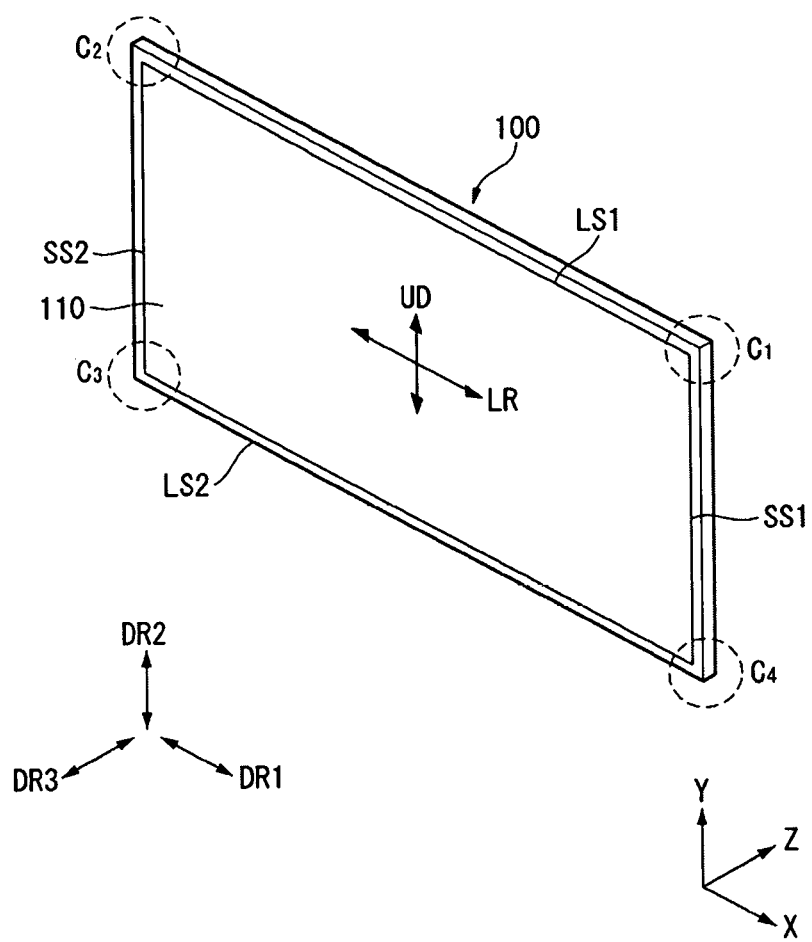

【Figure 2】
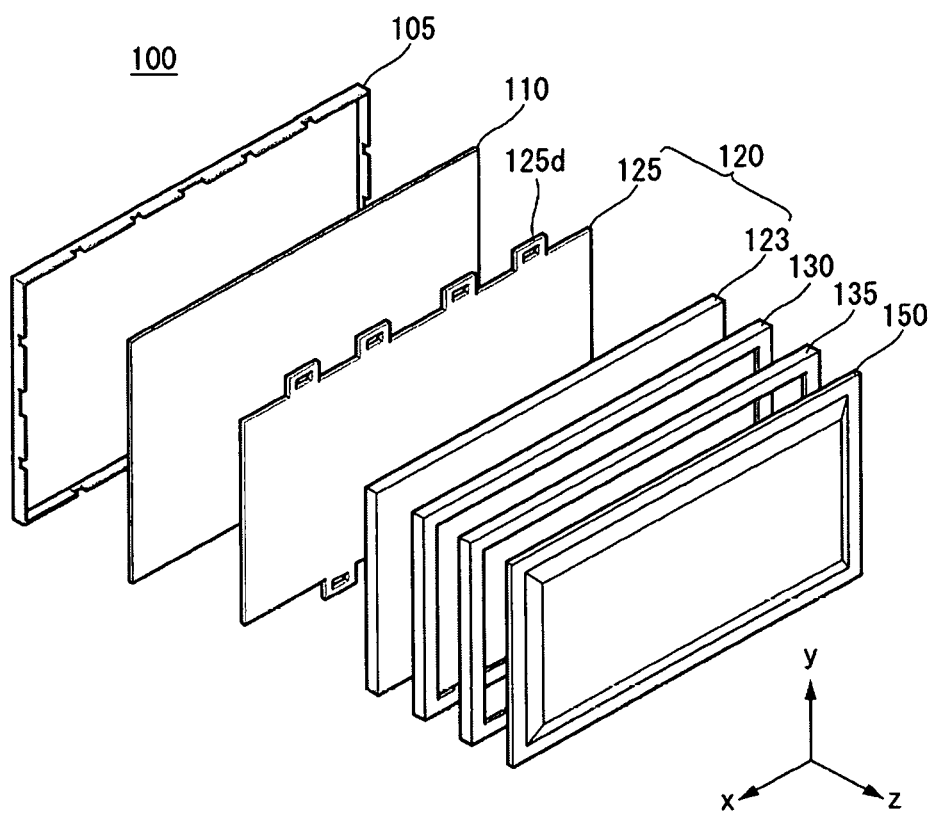

[Figure 3]
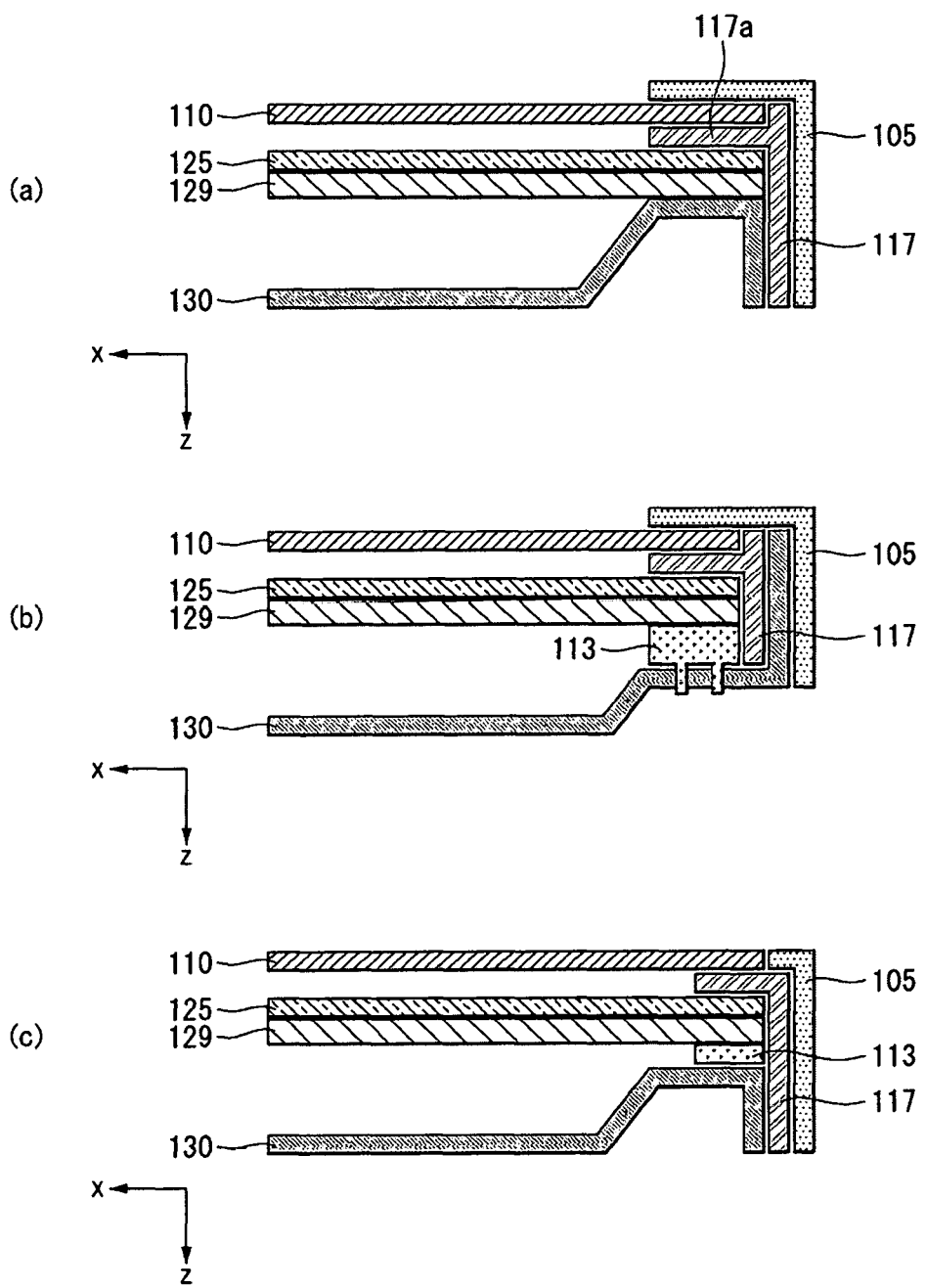

[Figure 4]
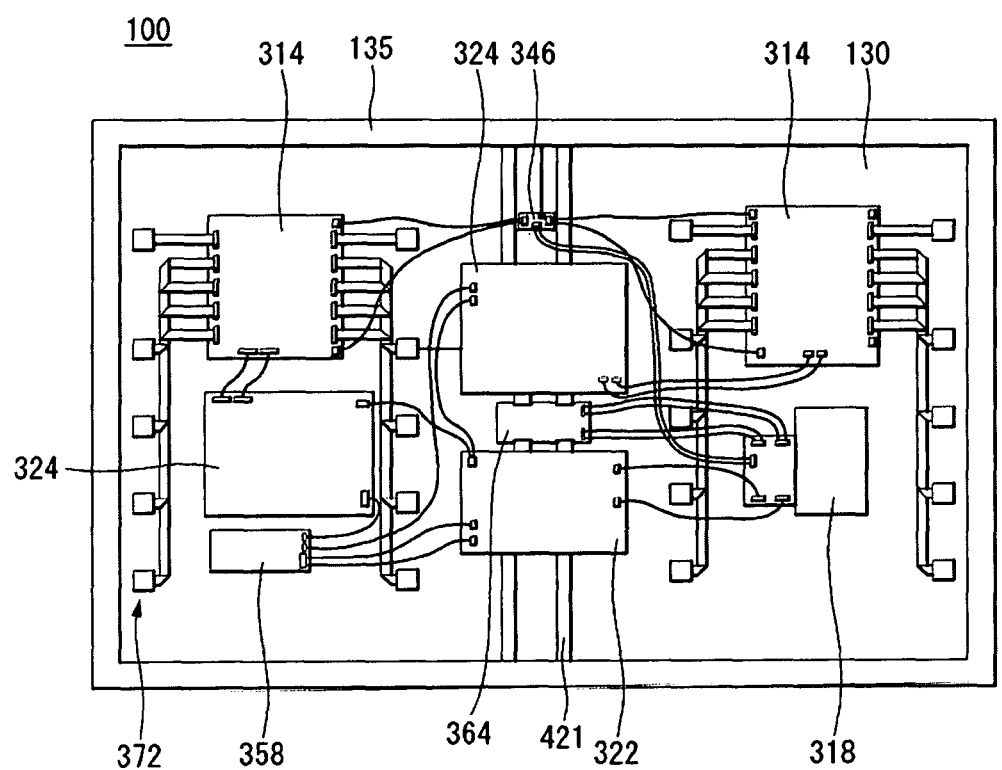

[Figure 5]
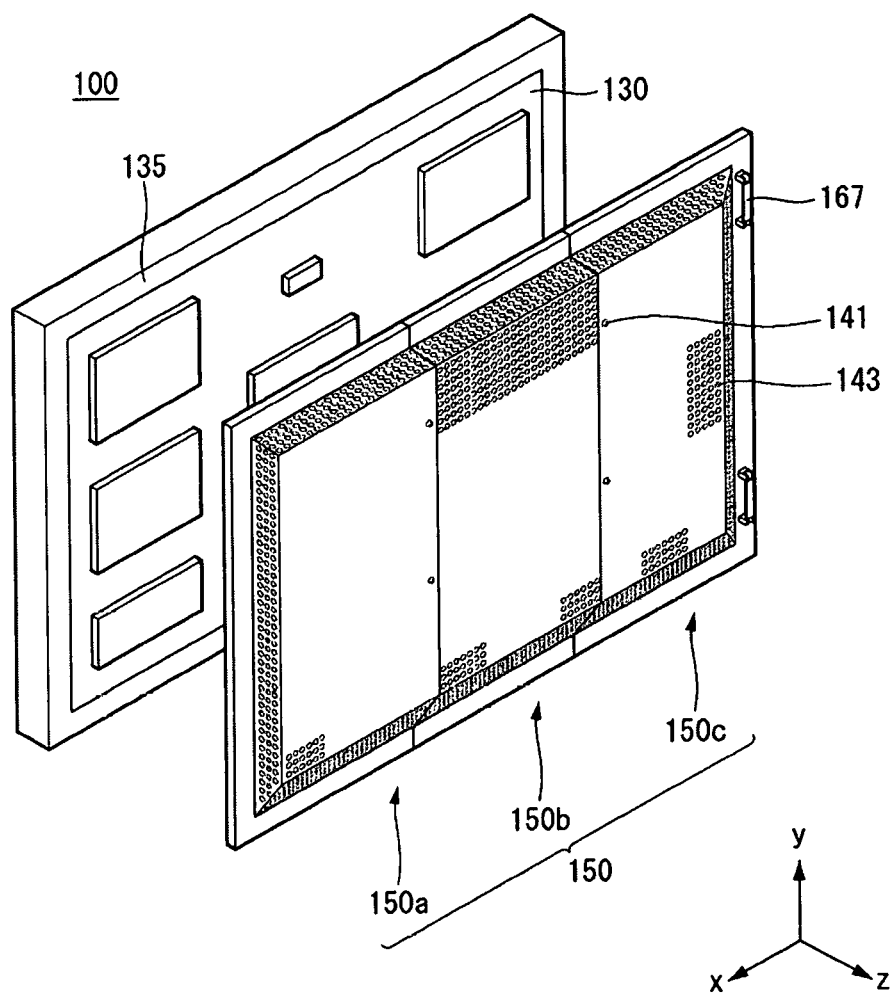

[Figure 6]
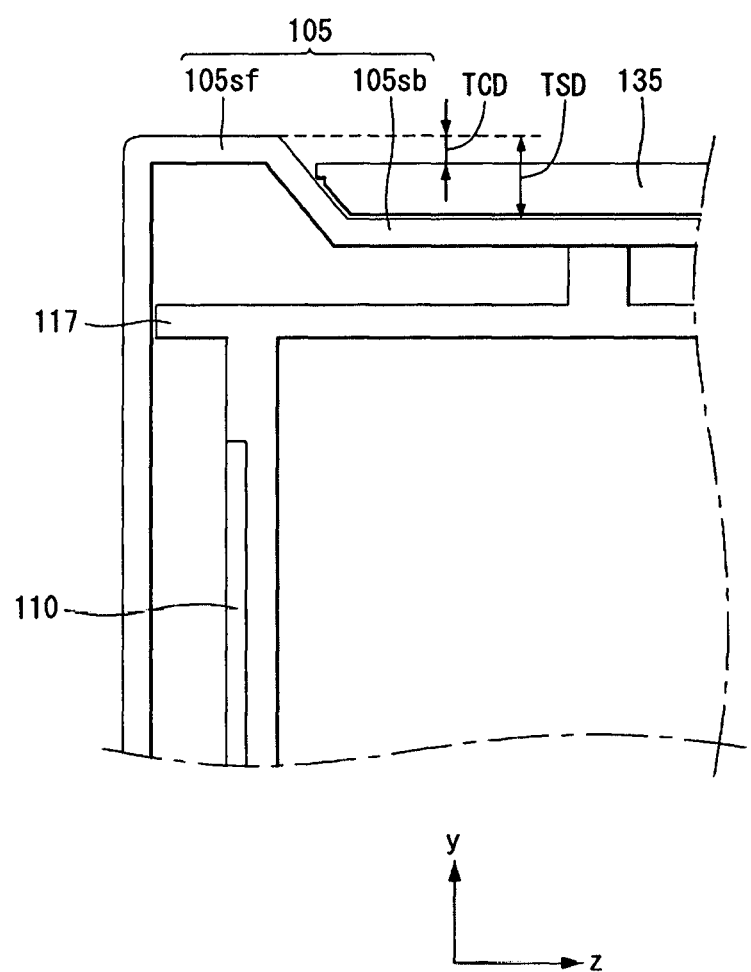

[Figure 7]
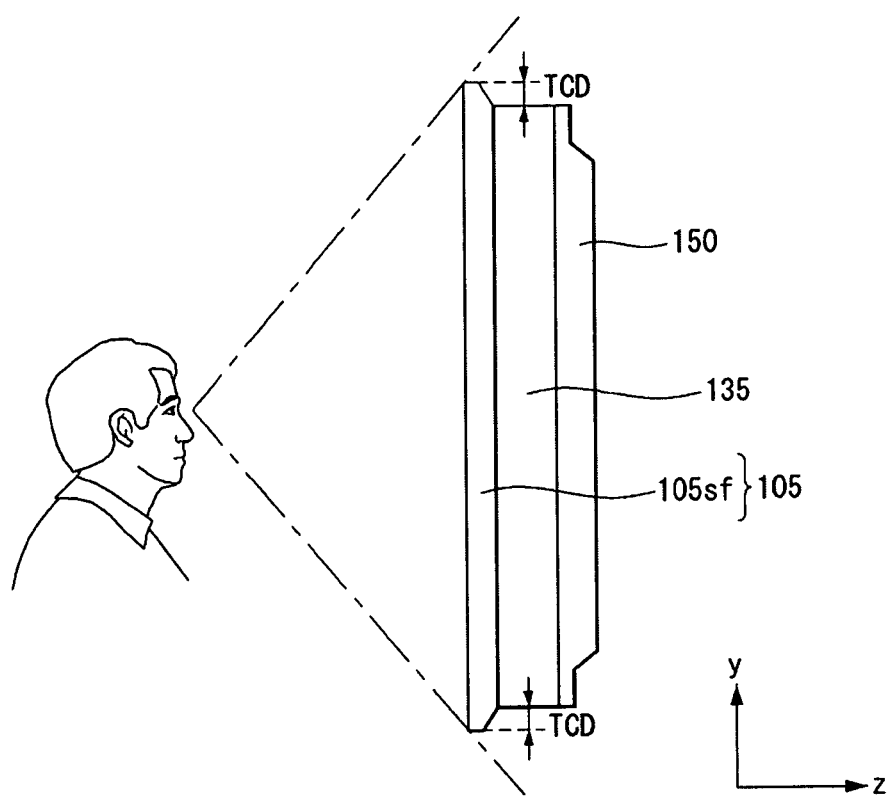

[Figure 8a]
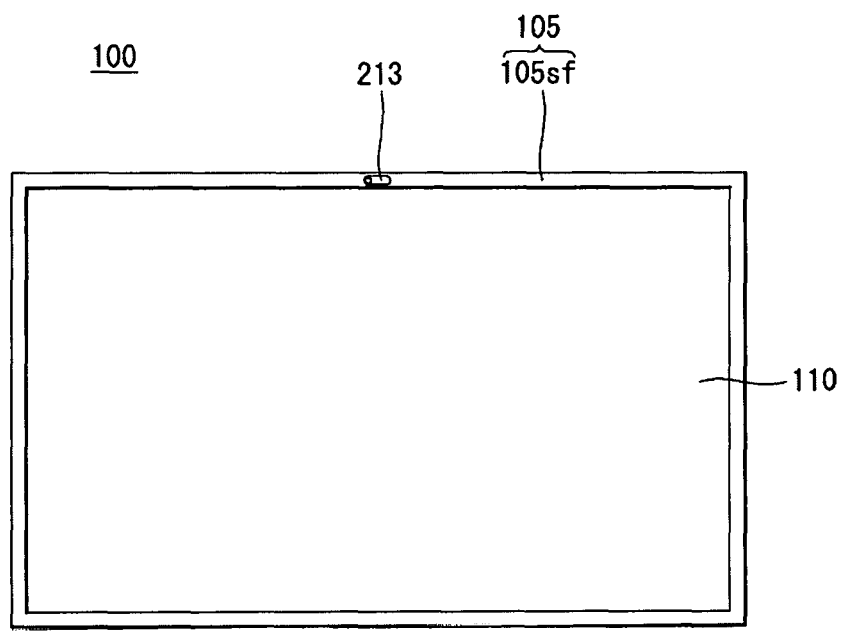

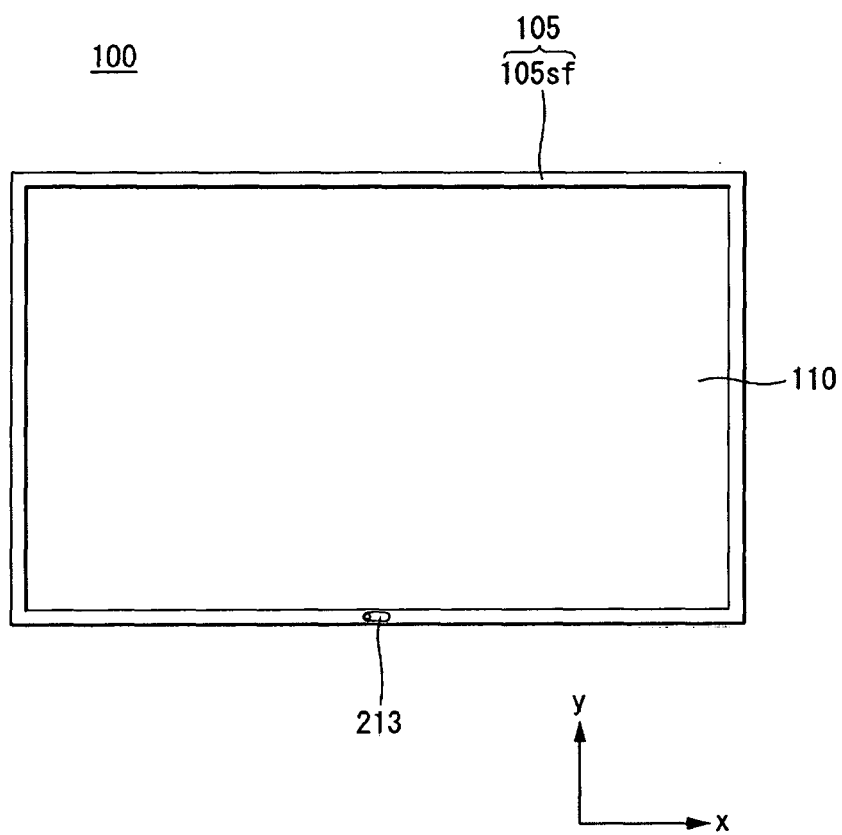
[Figure 8b]

[Figure 8c]
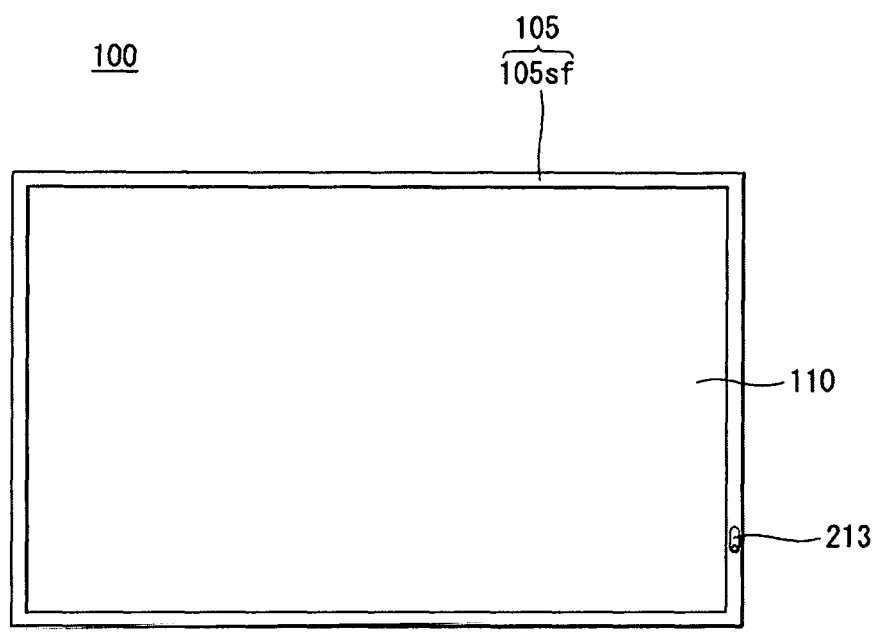

[Figure 8d]
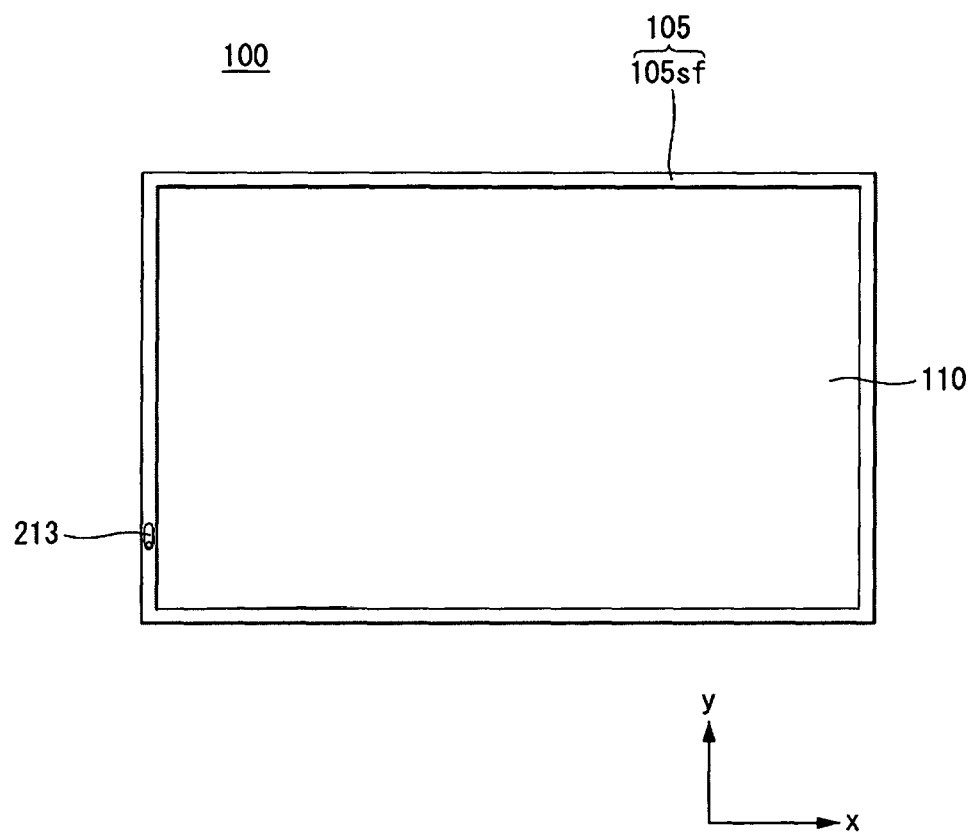

[Figure 9]
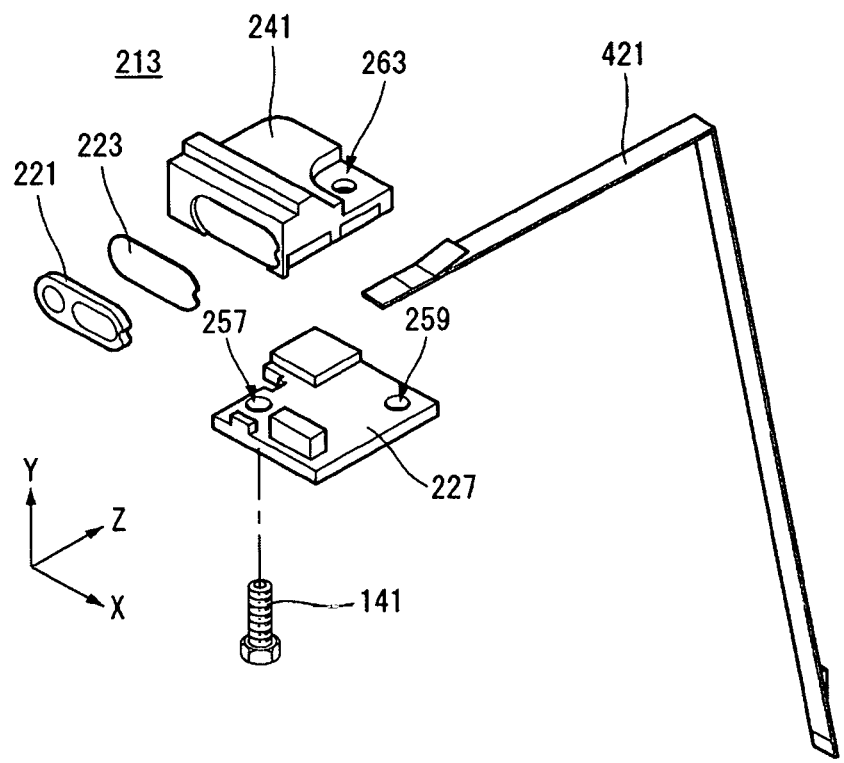

[Figure 10]
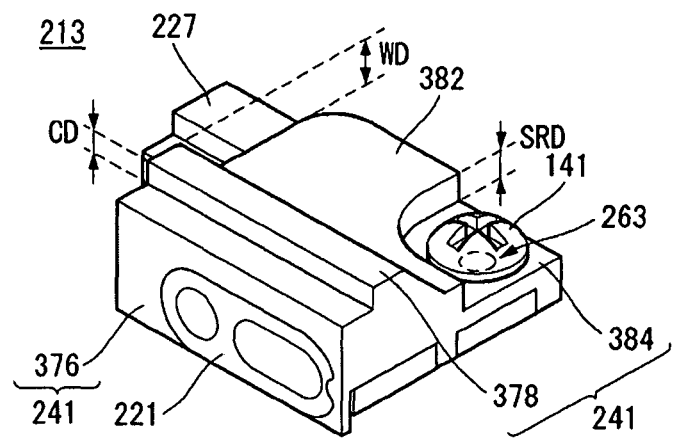
[Figure 11]
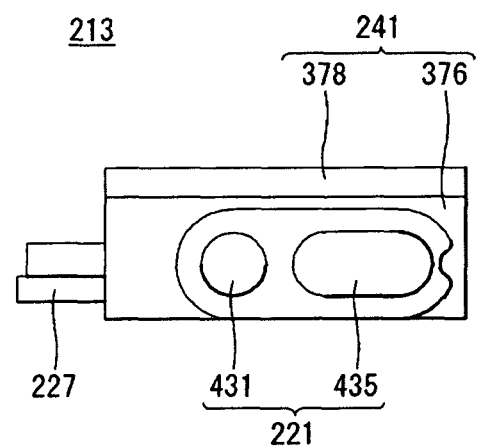

[Figure 12]
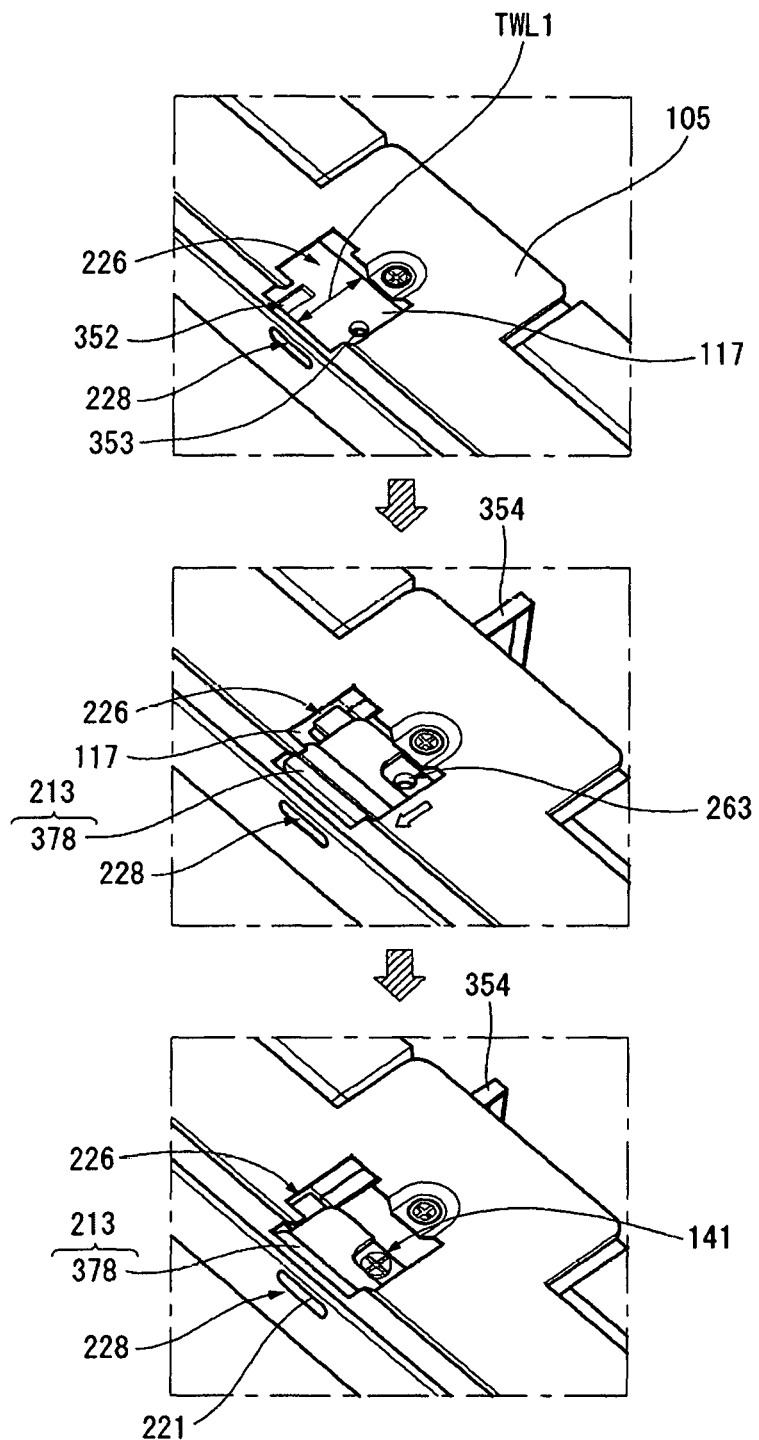

[Figure 13]
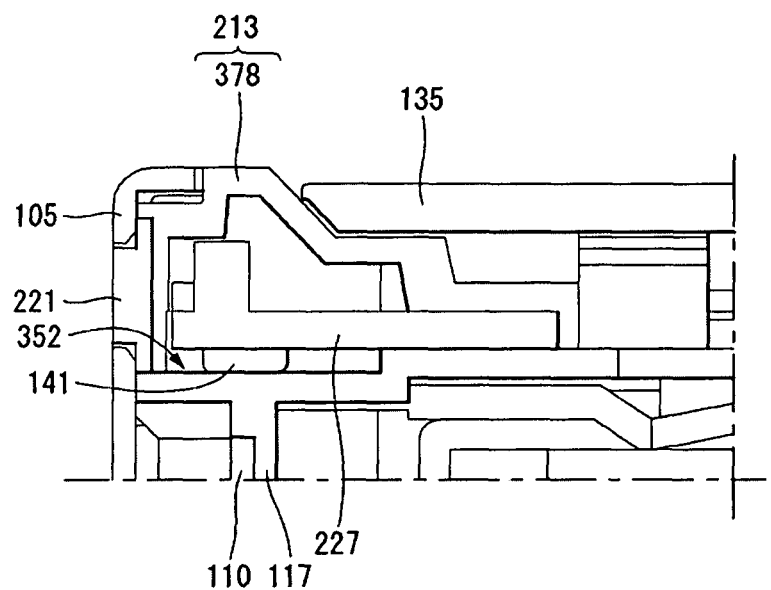
[Figure 14]
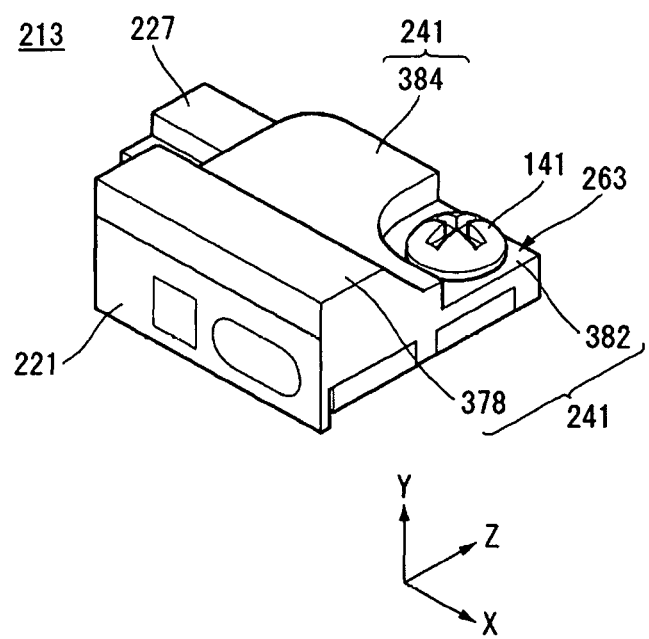

[Figure 15]
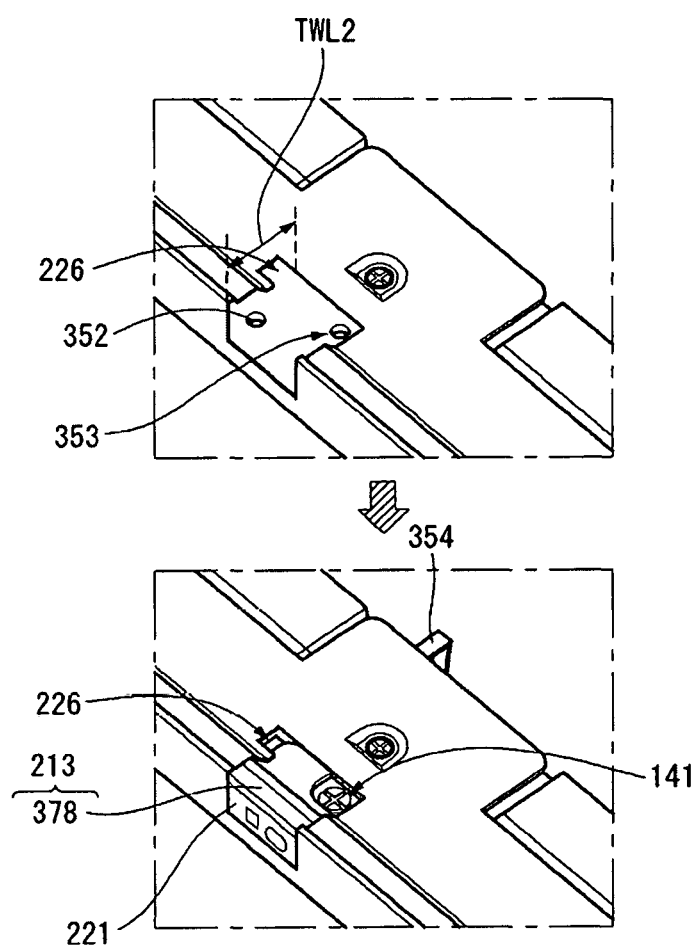

[Figure 16]
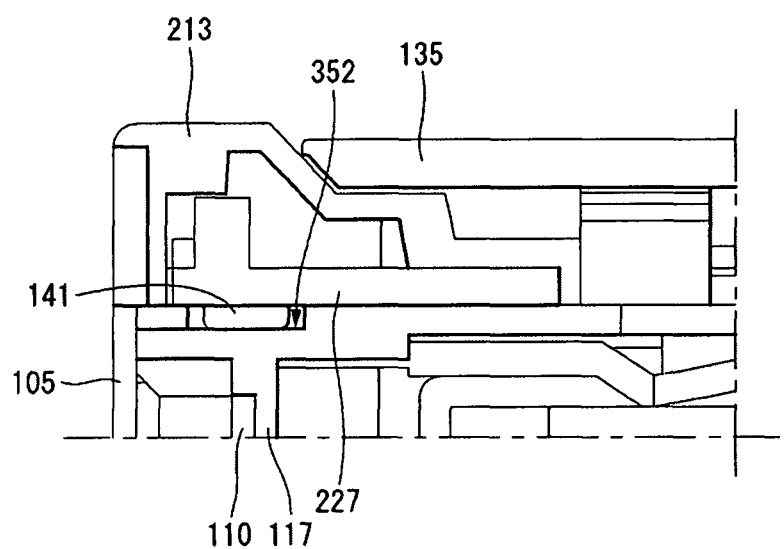

DISPLAY APPARATUS HAVING FRONT COVER WITH INFRARED SENSOR

CROSS REFERENCE TO RELATED APPLICATIONS

This application is the National Phase of PCT International Application No. PCT/KR2016/006615, filed on Jun. 22, 2016, which claims priority under 35 U.S.C. 119(a) to Patent Application No. 10-2016-0067351, filed in Republic of Korea on May 31, 2016, all of which are hereby expressly incorporated by reference into the present application.

TECHNICAL FIELD

The present disclosure relates to a display device.

BACKGROUND ART

With the development of the information society, various demands for display devices are increasing. Various display devices, such as liquid crystal displays (LCDs), plasma display panels (PDPs), electroluminescent displays (ELDs), and vacuum fluorescent displays (VFDs), have been recently studied and used in response to the various demands for the display devices.

Among the display devices, a liquid crystal panel of the LCD includes a liquid crystal layer and a TFT substrate and a color filter substrate that are positioned opposite each other with the liquid crystal layer interposed therebetween. The liquid crystal panel can display an image using light provided by a backlight unit.

The related art invention had a problem that that it may interfere with the immersion of users in a display screen since an infrared sensor is positioned outside a display device.

DISCLOSURE

Technical Problem

An object of the present disclosure is to address the above-described and other problems. Another object of the present disclosure is to provide an apparently neat display device by positioning an infrared sensor inside the display device.

Technical Solution

In order to achieve the above-described and other objects, in one aspect of the present disclosure, there is provided a display device comprising a display panel, a front cover including a front part shielding an edge area of a front surface of the display panel and a side part shielding a side surface of the display panel, a mounting hole being formed on the side part, a guide panel positioned between the display panel and the front cover and coupled to the side surface of the display panel, a backlight unit positioned at a rear surface of the display panel, a frame positioned at a rear surface of the backlight unit, and an infrared sensor inserted into the mounting hole.

A width of the mounting hole in a first direction may be greater than a width of the infrared sensor in the first direction, and the first direction may be a thickness direction of the display device.

A width of the mounting hole in a first direction may be equal to a width of the infrared sensor in the first direction, and the first direction may be a thickness direction of the display device.

The infrared sensor may be inserted into the mounting hole and may slidingly move so as to be in contact with the front part.

The mounting hole may be formed to be extended to the front part.

The side part may include a side front portion adjacent to a front surface of the display device, and a side rear portion positioned in a rear of the side front portion. The side front portion more may protrude to an outside of the display device by a predetermined interval than the side rear portion.

The infrared sensor may include a substrate on which a circuit pattern is formed, a cover shielding the substrate, and an infrared lens positioned on at least a portion of a front surface of the cover.

The front cover may include a lens hole formed in a portion corresponding to the infrared lens on the front part.

The cover may include a first portion constituting a front surface of the cover, and a second portion extended to a rear of the first portion. The second portion may be higher than the first portion by a predetermined length from a bottom surface.

The cover may include a first portion constituting a front surface of the cover, and a second portion extended to a rear of the first portion. The second portion may be in contact with the front part.

The infrared sensor may be positioned on the guide panel.

The guide panel may include a sliding groove for accommodating a portion of the infrared sensor that protrudes toward the guide panel.

The sliding groove may be extended in a front direction of the display device.

The guide panel may include a fixing groove for fixing the infrared sensor to the guide panel.

The display device may further comprise a middle cover covering at least a portion of a side surface and a rear surface of the frame. The middle cover may cover the side part of the front cover and at least a portion of the infrared sensor.

Advantageous Effects

Effects of a display device according to the present disclosure are described as follows.

According to at least one aspect of the present disclosure, the present disclosure can provide an apparently neat display device by positioning an infrared sensor inside the display device.

Further scope of applicability of the present disclosure will become apparent from the detailed description given hereinafter. However, it should be understood that the detailed description and specific examples, while indicating preferred embodiments of the disclosure, are given by illustration only, since various changes and modifications within the spirit and scope of the disclosure will become apparent to those skilled in the art from this detailed description.

DESCRIPTION OF DRAWINGS

FIGS. 1 to 7 illustrate configuration of a display device related to the present disclosure.

FIGS. 8a to 8d illustrate a location relationship between an infrared sensor and peripheral configuration according to an embodiment of the disclosure.

FIGS. 9 to 11 illustrate configuration of an infrared sensor according to an embodiment of the disclosure.

FIG. 12 illustrates a coupling method of an infrared sensor according to an embodiment of the disclosure.

FIG. 13 is a cross-sectional view of a sliding groove portion shown in FIG. 12.

FIG. 14 illustrates configuration of an infrared sensor according to another embodiment of the disclosure and shows a light assembly positioned on a substrate.

FIG. 15 illustrates a coupling method of an infrared sensor according to another embodiment of the disclosure.

FIG. 16 is a cross-sectional view of a sliding groove portion shown in FIG. 15.

MODE FOR INVENTION

Reference will now be made in detail to embodiments of the disclosure, examples of which are illustrated in the accompanying drawings. Wherever possible, the same reference numbers will be used throughout the drawings to refer to the same or like parts. In general, a suffix such as "module" and "unit" may be used to refer to elements or components. Use of such a suffix herein is merely intended to facilitate description of the specification, and the suffix itself is not intended to give any special meaning or function. It will be noted that a detailed description of known arts will be omitted if it is determined that the detailed description of the known arts can obscure the embodiments of the disclosure. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Hereinafter, embodiments of the disclosure are described using a liquid crystal display (LCD) panel as an example of a display panel. However, embodiments of the disclosure are not limited thereto. For example, a plasma display panel (PDP), a field emission display (FED) panel, and an organic light emitting diode (OLED) display panel may be used.

FIGS. 1 to 7 illustrate configuration of a display device related to the present disclosure.

As shown in FIG. 1, in the following description, a display device 100 may include a first long side LS1, a second long side LS2 opposite the first long side LS1, a first short side SS1 adjacent to the first long side LS1 and the second long side LS2, and a second short side SS2 opposite the first short side SS1.

In embodiments disclosed herein, the first short side SS1 may be referred to as a first side area, the second short side SS2 may be referred to as a second side area opposite the first side area, the first long side LS1 may be referred to as a third side area which is adjacent to the first side area and the second side area and is positioned between the first side area and the second side area, and the second long side LS2 may be referred to as a fourth side area which is adjacent to the first side area and the second side area, is positioned between the first side area and the second side area, and is opposite to the third side area.

Embodiments of the disclosure describe that lengths of the first and second long sides LS1 and LS2 are longer than lengths of the first and second short sides SS1 and SS2 for convenience of explanation. However, the lengths of the first and second long sides LS1 and LS2 may be almost equal to the lengths of the first and second short sides SS1 and SS2.

In the following description, a first direction DR1 may be a direction parallel to the long sides LS1 and LS2 of the display panel 100, and a second direction DR2 may be a direction parallel to the short sides SS1 and SS2 of the display panel 100.

A third direction DR3 may be a direction vertical to the first direction DR1 and/or the second direction DR2.

The first direction DR1 and the second direction DR2 may be commonly referred to as a horizontal direction. Further, the third direction DR3 may be referred to as a vertical direction.

From another aspect, a side of the display device 100 on which an image is displayed may be called a forward direction or a front side or a front surface. When the display device 100 displays an image, a side at which the image cannot be observed may be called a rearward direction or rear side or a rear surface. When the display device 100 is viewed from the forward direction or the front surface, the first long side LS1 may be called an upper side or an upper surface. In the same manner, the second long side LS2 may be called a lower side or a lower surface. In the same manner, the first short side SS1 may be called a left side or a left surface, and the second short side SS2 may be called a right side or a right surface.

Further, the first long side LS1, the second long side LS2, the first short side SS1, and the second short side SS2 may be referred to as edges of the display device 100. Positions where the first long side LS1, the second long side LS2, the first short side SS1, and the second short side SS2 meet one another may be referred to as corners. For example, a position where the first long side LS1 and the first short side SS1 meet each other may be referred to as a first corner C1, a position where the first long side LS1 and the second short side SS2 meet each other may be referred to as a second corner C2, a position where the second short side SS2 and the second long side LS2 meet each other may be referred to as a third corner C3, and a position where the second long side LS2 and the first short side SS1 meet each other may be referred to as a fourth corner C4.

In embodiments disclosed herein, a direction from the first short side SS1 to the second short side SS2 or a direction from the second short side SS2 to the first short side SS1 may be referred to as a left-right direction LR. A direction from the first long side LS1 to the second long side LS2 or from the second long side LS2 to the first long side LS1 may be referred to as an up-down direction UD.

As shown in FIG. 2, the display device 100 according to the present disclosure may include a front cover 105, a display panel 110, a backlight unit 120, a frame 130, a middle cover 135, and a back cover 150.

The front cover 105 may cover at least a portion of a front surface and a side surface of the display panel 110. The front cover 105 may have a rectangular frame shape, in which a center portion is empty. Because the center portion of the front cover 105 is empty, an image on the display panel 110 may be displayed to the outside.

The front cover 105 may be divided into a front part and a side part. Namely, the front cover 105 may include the front part positioned at the front surface of the display panel 110 and the side part positioned at the side surface of the display panel 110. The front part and the side part may be separately configured. One of the front part and the side part may be omitted. For example, for the purpose of a beautiful design, the front part may be omitted and only the side part may be present.

The display panel 110 may be provided in front of the display device 100 and may display an image. The display panel 110 may divide an image into a plurality of pixels and may output the image while controlling color, brightness, and chroma of each pixel. The display panel 110 may include an active area, on which the image is displayed, and an inactive area, on which the image is not displayed. The display panel 110 may include a front substrate and a rear substrate that are positioned opposite each other with a liquid crystal layer interposed therebetween.

The front substrate may include a plurality of pixels each including red (R), green (G), and blue (B) subpixels. The front substrate may generate an image corresponding to red, green, or blue color in response to a control signal.

The rear substrate may include switching elements. The rear substrate may switches on or off pixel electrodes. For example, the pixel electrodes may change a molecule arrangement of the liquid crystal layer in response to a control signal received from the outside. The liquid crystal layer may include a plurality of liquid crystal molecules. The arrangement of the liquid crystal molecules may be changed depending on a voltage difference between the pixel electrode and a common electrode. The liquid crystal layer may transmit light provided by the backlight unit 120 to the front substrate.

The backlight unit 120 may be positioned at a rear surface of the display panel 110. The backlight unit 120 may include a plurality of light sources. The light sources of the backlight unit 120 may be arranged in an edge type or a direct type. In case of the edge type backlight unit 120, a light guide plate may be further included.

The backlight unit 120 may be coupled to a front surface of the frame 130. For example, the plurality of light sources may be disposed at the front surface of the frame 130. In this instance, the backlight unit 120 may be commonly called the direct type backlight unit 120.

The backlight unit 120 may be driven in an entire driving method or a partial driving method, such as a local dimming method and an impulsive driving method. The backlight unit 120 may include an optical sheet 125 and an optical layer 123.

The optical sheet 125 enables light of the light sources to be uniformly transmitted to the display panel 110. The optical sheet 125 may include a plurality of layers. For example, the optical sheet 125 may include at least one prism sheet and/or at least one diffusion sheet.

The optical sheet 125 may further include at least one coupling portion 125d. The coupling portion 125d may be coupled to the front cover 105 and/or the frame 130. Namely, the coupling portion 125d may be directly coupled to the front cover 105 and/or the frame 130. Alternatively, the coupling portion 125d may be coupled to a structure coupled on the front cover 105 and/or the frame 130. Namely, the coupling portion 125d may be indirectly coupled to the front cover 105 and/or the frame 130.

The optical layer 123 may include the light source, etc. The detailed configuration of the optical layer 123 will be described in the corresponding paragraphs.

The frame 130 may function to support components constituting the display device 100. For example, configuration such as the backlight unit 120 may be coupled to the frame 130. The frame 130 may be formed of a metal material, for example, an aluminum alloy.

At least one PCB may be coupled to a rear surface of the frame 130. The PCBs may be separated from each other. A detailed coupling relationship of the frame 130 and the PCB will be described later.

An edge portion of the frame 130 may protrude in a rear direction compared to other portions. Hence, a space where at least one PCB will be mounted may be formed inside the frame 130.

The middle cover 135 may cover at least a portion of a side surface and the rear surface of the frame 130. The middle cover 135 may have a rectangular frame shape, in which a center portion is empty, in the same manner as the front cover 105. Because the center portion of the middle cover 135 is empty, the middle cover 135 may have a space where at least one PCB positioned on the rear surface of the frame 130 will be mounted.

The middle cover 135 may be divided into a rear middle cover positioned at the rear surface of the frame 130 and a side middle cover positioned at the side surface of the frame 130. One of the rear middle cover and the side middle cover may be omitted. For example, for the purpose of a beautiful design, the rear middle cover may be omitted and only the side middle cover may be present.

The back cover 150 may be positioned at a rear surface of the display device 100. The back cover 150 may protect an internal configuration of the display device 100 from the outside. At least a portion of the back cover 150 may be coupled to the frame 130 and/or the middle cover 135. For example, at least a portion of the back cover 150 may be coupled to the rear middle cover of the middle cover 135. The back cover 150 may be an injection formed of a resin material.

FIG. 3 illustrates configuration of the optical sheet 125, etc.

As shown in (a) of FIG. 3, the optical sheet 125 and/or a diffusion plate 129 may be positioned on the frame 130. The optical sheet 125 and/or the diffusion plate 129 may be coupled to the frame 130 at an edge of the frame 130. The optical sheet 125 and/or the diffusion plate 129 may be directly placed at the edge of the frame 130. Namely, an outer perimeter of the optical sheet 125 and/or the diffusion plate 129 may be supported by the frame 130. An edge upper surface of the optical sheet 125 and/or the diffusion plate 129 may be surrounded by a first guide panel 117. For example, the optical sheet 125 and/or the diffusion plate 129 may be positioned between the edge of the frame 130 and a flange 117a of the first guide panel 117.

The display panel 110 may be positioned at a front surface of the optical sheet 125. An edge of the display panel 110 may be coupled to the first guide panel 117. Namely, the display panel 110 may be supported by the first guide panel 117.

An edge area of the front surface of the display panel 110 may be surrounded by the front cover 105. For example, the display panel 110 may be positioned between the first guide panel 117 and the front cover 105.

As shown in (b) of FIG. 3, the display device 100 according to an embodiment of the disclosure may further include a second guide panel 113. The optical sheet 125 and/or the diffusion plate 129 may be coupled to the second guide panel 113. Namely, the second guide panel 113 may have a shape, in which the second guide panel 113 is coupled to the frame 130, and the optical sheet 125 and/or the diffusion plate 129 are/is coupled to the second guide panel 113. The second guide panel 113 may be formed of a material different from the frame 130. The frame 130 may have a shape surrounding the first and second guide panels 117 and 113.

As shown in (c) of FIG. 3, in the display device 100 according to an embodiment of the disclosure, the front cover 105 may not cover the front surface of the display panel 110. Namely, one end of the front cover 105 may be positioned on the side surface of the display panel 110.

As shown in FIG. 4, in the display device 100 according to an embodiment of the disclosure, at least one PCB may be positioned on the rear surface of the frame 130.

For example, at least one PCB may be a power input board 358. The power input board 358 may transfer power input from the outside to other PCB. The power input board 358 may be positioned at a lower end of one side of the rear surface of the frame 130.

As another example, at least one PCB may be a power supply. The power supply may supply power to the display device. The power supply may convert an AC frequency into a DC frequency. Namely, the power supply may convert a low frequency into a high frequency and may improve electrical efficiency.

Because an area of the display device 100 is very large, power consumed in the display device 100 may very increase. Hence, when the display device is driven using one power supply, significantly more heat may be concentrated on the display device 100. In this case, the display device 100 may be damaged or malfunction due to the deterioration.

In the display device 100 according to the embodiment of the disclosure, the power supply may include a master power supply 322 and a slave power supply 324. Hence, power consumption is distributed, and the display device 100 can be prevented from being damaged or malfunctioning.

For example, the master power supply 322 may be positioned at a lower end of a center of the rear surface of the frame 130, and the two slave power supplies 324 may be positioned at an upper end of the center and in a center of one side in the rear surface of the frame 130.

The master power supply 322 and the two slave power supplies 324 may receive power from the power input board 358. Further the master power supply 322 may transfer power to the two slave power supplies 324.

At least one PCB may be a driver board 314. The driver board 314 may be a PCB for driving the backlight unit 120 (see FIG. 2). The driver board 314 may receive power from the slave power supply 324. The driver board 314 may transfer an electrical signal to the backlight unit 120 (see FIG. 2) via a plurality of flat flex cables (FFC cables) 421. The FFC cables 421 may be connected to the backlight unit 120 (see FIG. 2) of the front surface of the frame 130 through wire holes 372 formed on the frame 130.

For example, the driver boards 314 may be positioned at an upper end of one side and an upper end of the other side in the rear surface of the frame 130. The driver boards 314 may respectively receive power from the slave power supplies 324.

For example, at least one PCB may be a main board 318. The main board 318 may receive power from the master power supply 322. The main board 318 may provide an interface for operating the display device. Further, the main board 318 may check and control an operation state of the respective components of the display device and thus may make the components of the display device in an optimum state. The main board 318 may be positioned in a center of the other side of the rear surface of the frame 130

At least one PCB may be a timing controller board 364. The timing controller board 105 may transmit a signal input from the main board 318 to the display panel 110. Namely, the timing controller board 105 may transmit timing signals CLK, LOAD, and SPi for controlling a source PCB and video signals R, G, and B to the source PCB. Further, the timing controller board 105 may control an image. The timing controller board 105 may transmit the input signal to the display panel 110 (see FIG. 2) using the FFC cables 421. The FFC cables 421 may be connected through the upper and lower sides of the frame 130.

The timing controller board 105 may be positioned in the center of the rear surface of the frame 130. Namely, the timing controller board 105 may be positioned between the slave power supply 324 and the master power supply 322.

At least one PCB may be an infrared board 346. The infrared board 346 may transmit a received infrared signal to the main board 318.

The infrared board 346 may function to transmit a signal received from the main board 318 to other parts. For example, the signal received from the main board 318 may be transmitted to the driver board 314 through the infrared board 346. Namely, the infrared board 346 can help prevent wires from tangling or interfering with other PCBs.

The display device according to the present disclosure has the very large display screen and thus may require more PCBs and wires. Hence, a heat generation function may be more important.

As shown in FIG. 5, the back cover 150 may be coupled to the rear surface of the frame 130. More specifically, the back cover 150 may be coupled to the rear middle cover of the middle cover 135 positioned at an edge of the rear surface of the frame 130.

The back cover 150 may include first to third back covers 150a to 150c. Because the display device according to the present disclosure has the very large display screen, the back cover 150 may be divided into a plurality of back covers. Hence, storage of the back cover 150 may be facilitated, and it may be easier to manufacture the back cover 150. The first to third back covers 150a to 150c may be coupled to each other through a screw 141.

A center portion of the back cover 150 may protrude more than an edge portion of the back cover 150 in a rear direction. Hence, a space where at least one PCB will be positioned may be provided on the frame 130.

The back cover 150 may have a plurality of fine holes 143 in a portion of a rear surface of the back cover 150 and on a side of a protruding portion of the back cover 150. The fine holes 143 can easily dissipate heat generated in at least one PCB on the frame 130 to the outside. Because most of the fine holes 143 are positioned on the side surface of the back cover 150, the fine holes 143 may not be seen from the rear and may be better in an external appearance.

A handle 167 may be positioned at each of upper and lower ends of one side of an edge of the back cover 150. The handle 167 can help facilitate the transportation of the display device 100 with a large area. FIG. 5 illustrates that the handles 167 are positioned on one side of the edge of the back cover 150 by way of example. However, the present disclosure is not limited thereto, and the handles 167 may be positioned on both sides of the edge of the back cover 150.

As shown in FIG. 6, a side front portion 105sf of the front cover 105 may be higher than a side rear portion 105sb of the front cover 105 by a predetermined interval TSD toward the outside of the display device. The front cover 105 may have a shape in which the side rear portion 105sb is bent inwardly from the side front portion 105sf so that the side front portion 105sf is higher than the side rear portion 105sb.

In this case, even if the upper side of the front cover 105 is covered with the middle cover 135, the side front portion 105sf of the front cover 105 may be higher than a side surface of the middle cover 135 by a predetermined interval TCD toward the outside of the display device. Namely, a thickness of the middle cover 135 may be less than a difference TSD between the side front portion 105*sf* and the side rear portion 105*sb*.

Hence, as shown in FIG. 7, because the side front portion 105*sf* of the front cover 105 protrudes more than the middle cover 135 by a predetermined interval TCD when viewed from the front, the middle cover 135 and the back cover 150 positioned in the rear of the transmit middle cover 135 may not be conspicuous. In this case, the user can concentrate more on the display screen because the structures other than the display screen are not conspicuous.

FIGS. 8*a* to 8*d* illustrate a location relationship between an infrared sensor and peripheral configuration according to an embodiment of the disclosure.

As shown in FIG. 8, an infrared (IR) sensor 213 may be positioned on one side of the display device 100 according to the embodiment of the disclosure. More specifically, the infrared sensor 213 may be positioned on a front portion 105*f* of the front cover 105. The infrared sensor 213 may sense an infrared signal transmitted from a remote controller. Namely, the infrared sensor 213 can help adjust the overall operation of the display device 100 using the remote controller.

The infrared sensor 213 may be positioned in various portions depending on an installation position of the display device 100. The infrared sensor 213 may be positioned in a portion similar to a height of the remote controller so that an infrared signal of the remote controller is strongly sensed.

For example, as shown in FIG. 8*a*, the infrared sensor 213 may be positioned on a first long side portion of the display device 100. For another example, as shown in FIG. 8*b*, the infrared sensor 213 may be positioned on a second long side portion of the display device 100. For another example, as shown in FIG. 8*c*, the infrared sensor 213 may be positioned on a first short side portion of the display device 100. For another example, as shown in FIG. 8*d*, the infrared sensor 213 may be positioned on a second first short side portion of the display device 100.

FIGS. 9 to 11 illustrate configuration of an infrared sensor according to an embodiment of the disclosure.

As shown in FIG. 9, the infrared sensor 213 may include a cover 241, an infrared lens 221, and a substrate 227.

The substrate 227 may be a portion where a circuit for sensing infrared light is patterned. The FFC cable 421 may be connected to one end of the infrared substrate 227. The other end of the substrate 227 may be connected to the infrared board 346 (see FIG. 4) positioned on the rear surface of the frame via the FFC cable 421.

A first hole 257 and a second hole 259 may be formed on the substrate 227. The first hole 257 and the second hole 259 may be positioned on opposite sides of the substrate 227 in a long axis direction of the substrate 227. However, the present disclosure is not limited thereto, and the first hole 257 and the second hole 259 may be positioned on the same side of the substrate 227. A coupling relationship of the first hole 257 and the second hole 259 using a screw 141 will be described later.

The cover 241 may be a portion that covers the substrate 227. Namely, the cover 241 may shield the substrate 227 so that the substrate 227 is not exposed to the outside. The cover 241 may form an appearance of the infrared sensor 213. The cover 241 may include a cover hole 263 on its one side. The cover hole 263 may be positioned at a portion corresponding to the second hole 259 of the substrate 227.

The cover 241 may be coupled to the substrate 227 through the first hole 257 and the second hole 259. Although not shown, the first hole 257 may be coupled to a groove positioned on a lower surface of the cover 241 through the screw 141. Namely, the screw 141 may pass through the substrate 227 from the lower surface of the substrate 227 and may be coupled to the cover 241.

The second hole 259 may be coupled to the cover hole 263 through the screw 141. Although not shown, the screw 141 may pass through the second hole 259 and the cover hole 263 and may be coupled to the guide panel 113 (see FIG. 3) or the front cover 105 (see FIG. 3). Namely, the infrared sensor 213 may be fixed to the display device through the second hole 259 and the cover hole 263.

The cover 241 may be coupled to the infrared lens 221 using a double-sided tape 223 on its front surface. The infrared lens 221 may be a part that receives an infrared signal. The infrared lens 221 may be a part for concentrating and transmitting infrared light received from the remote controller.

As shown in FIG. 10, the cover 241 may include first to fourth portions 376, 378, 382 and 384. The first to fourth portions 376, 378, 382 and 384 may have different heights from a bottom surface of the cover 241.

The first portion 376 may form a front surface of the cover 241. Hence, the infrared lens 221 may be attached to the first portion 376.

The second portion 378 may be extended to the rear of the first portion 376. The second portion 378 may be higher than the first portion 376 by a predetermined length CD from the bottom surface of the cover 241. The second portion 378 protruding due to a difference of the length CD may be straddled over the front cover.

The third portion 382 may be extended to the rear of the second portion 378. The third portion 382 may be lower than the second portion 378 by a predetermined length WD from the bottom surface of the cover 241. The height WD may be equal to the height difference TSD (see FIG. 6) between the front portion 105*sf* (see FIG. 6) and the rear portion 105*sb* (see FIG. 6) of the front cover 105 (see FIG. 6). Hence, when the infrared sensor 213 is fitted in the front cover 105 (see FIG. 6), the appearance of the display device may appear to be neat.

The fourth portion 384 may be extended to one side of the third portion 382. The fourth portion 384 may be formed in an area surrounding the cover hole 263. Namely, the fourth portion 384 may be a portion where the infrared sensor 213 is fixed by the screw 141. The fourth portion 384 may be lower than the third portion 382 by a predetermined length SRD. The height SRD may be equal to or greater than a length of a head of the screw 141. Hence, the screw 141 may not protrude upward from the cover 241.

In the display device according to the present disclosure, the heights of respective portions of the cover 241 may be different. Hence, the infrared sensor 213 may be convenient to assemble and may be apparently neat.

As shown in FIG. 11, the infrared lens 221 may be positioned on at least a portion of a front surface of the first portion 376. The infrared lens 221 may include a polycarbonate material. Hence, the infrared lens 221 may be easy to process and may have an excellent impact resistance. The infrared lens 221 may include an illuminance sensor 431 and an infrared receiver 435. The infrared lens 221 may print a rear surface of the portion other than the illuminance sensor 431 and the infrared receiver 435 in black to prevent light from being transmitted.

The illuminance sensor 431 may be in a transparent state because it is not coated with other material. When the display device is turned on, the illuminance sensor 431 may sense the surrounding visible light. The illuminance sensor 431 may output an illuminance sensing signal according to an amount of visible light detected. A controller for controlling a control signal of the display device may receive the illuminance sensing signal and control the screen brightness of the display device.

The infrared receiver 435 may be positioned to be spaced apart from the illuminance sensor 431. Hence, the illuminance sensor 431 may be less affected by infrared light when detecting an amount of visible light. The infrared receiver 435 may be a part that receives infrared light from the remote controller. A rear surface of the infrared receiver 435 may be printed in black that can transmit infrared light.

The infrared lens 221 is positioned only on a portion of the front surface of the cover 241 not the entire front surface of the cover 241 and thus can save the manufacturing cost.

FIG. 12 illustrates a coupling method of an infrared sensor according to an embodiment of the disclosure. FIG. 13 is a cross-sectional view of a sliding groove portion shown in FIG. 12.

As shown in FIGS. 12 and 13, the infrared sensor 213 may be mounted on the display device. The front cover 105 may have a mounting hole 226 in an area in which the infrared sensor 213 is mounted. The mounting hole 226 may be formed on the side cover of the front cover 105. A length TWL1 of the mounting hole 226 in a thickness direction of the display device may be greater than a length of the infrared sensor 213 in the thickness direction of the display device. Hence, after the infrared sensor 213 is inserted into the mounting hole 226, the infrared sensor 213 may be slidingly coupled in a front direction. Namely, the infrared sensor 213 may be inserted into the mounting hole 226 and may slidingly move so as to be in contact with the front cover of the front cover 105.

A lens hole 228 may be positioned on the front cover of the front cover 105. The lens hole 228 may be a portion corresponding to the infrared lens 221 when the infrared sensor 213 has been coupled. Because the front cover of the front cover 105 shields the portion other than the lens hole 228, the user may feel that the appearance of the display device is neat.

As shown, after the infrared sensor 213 is inserted into the mounting hole 226, the infrared sensor 213 may be slidingly coupled in the front direction. More specifically, the infrared sensor 213 may be moved to the front so that the second portion 378 of the infrared sensor 213 is in contact with the front cover of the front cover 105.

The guide panel 117 may have a sliding groove 352 and a fixing groove 353 positioned on a portion corresponding to the mounting hole 226. The sliding groove 352 may be extended in a direction in which the infrared sensor 213 slides. For example, the sliding groove 352 may be extended in the front direction of the display device. The sliding groove 352 can prevent a protruding portion of the screw 141 coupled to the first hole 257 (see FIG. 9) of the infrared sensor 263 from contacting the guide panel 117.

The fixing groove 353 may be a portion in which the screw 141 is fixed to the guide panel 117 through the cover hole 263 and the second hole 259 (see FIG. 9) of the infrared sensor 213. Hence, the fixing groove 353 may be positioned at a portion corresponding to the position of the cover hole 263 and the second hole 259 (see FIG. 9) after the infrared sensor 213 slides to the front.

After the infrared sensor 213 is fixed to the guide panel 117, the middle cover 135 may partially cover the infrared sensor 213 and the front cover 105. Hence, a portion of the infrared sensor 213 and the mounting hole 226 may not be exposed to the outside.

In the display device according to the present disclosure, the infrared sensor 213 may be easily in close contact with the guide panel 117 by the sliding groove 352. Further, the second portion 378 may contact the front cover of the front cover 105, and thus the infrared sensor 213 may be easily assembled to the front cover 105.

FIG. 14 illustrates configuration of an infrared sensor according to another embodiment of the disclosure and shows a light assembly positioned on a substrate.

As shown in FIG. 14, in a display device according to another embodiment of the disclosure, a cover 241 may include second to fourth portions 378, 382 and 384. Namely, it may mean that there is no portion having a varying width in front of the cover 241. Because an infrared sensor 213 is not slidingly coupled to the display device, the cover 241 may not require a portion straddled over a front cover of a front cover 105 (see FIG. 6). Thus, the cover 241 may have a constant height from a bottom surface of a front portion Further, an infrared lens 221 may be positioned on an entire front surface of the cover 241 not a portion of the front surface of the cover 241. In this case, because an area of the infrared lens 221 increases, it may be better to sense an infrared signal. Further, because the infrared, lens 221 is positioned on the entire front surface of the cover 241, the user may feel that an appearance of the display device is neater.

FIG. 15 illustrates a coupling method of an infrared sensor according to another embodiment of the disclosure. FIG. 16 is a cross-sectional view of a sliding groove portion shown in FIG. 15.

As shown in FIGS. 15 and 16, the infrared sensor 213 may be mounted on the display device. The front cover 105 may have a mounting hole 226 in an area in which the infrared sensor 213 is mounted. The mounting hole 226 may be formed on a portion of a front cover as well as a side cover of the front cover 105. A length TWL2 of the mounting hole 226 in a thickness direction of the display device may be equal or similar to a length of the infrared sensor 213 in the thickness direction of the display device. Hence, the infrared sensor 213 may be not slidingly coupled but simply coupled to the mounting hole 226. In this case, because the infrared sensor 213 does not slide in the mounting hole 226, a sliding groove 352 may not be extended in one direction. Namely, the sliding groove 352 may have a circular shape or a rectangular shape surrounding a protruding portion of a screw 141.

In the display device according to the present disclosure, the infrared sensor 213 may be not slidingly coupled but simply coupled to a guide panel 217. Hence, the infrared sensor 213 can be more easily assembled to the display device.

Any or all elements of the embodiments of the disclosure described above may be combined or combined with each other in configuration or function. For example, a configuration "A" described in one embodiment of the disclosure and the drawings and a configuration "B" described in another embodiment of the disclosure and the drawings may be combined with each other. Namely, although the combination between the configurations is not directly described, the combination is possible except in the case where it is described that the combination is impossible. This is obvious when considering that the present disclosure is for the display device.

The foregoing embodiments are merely examples and are not to be considered as limiting the present disclosure. The scope of the present disclosure should be determined by rational interpretation of the appended claims, and all modifications within the equivalents of the disclosure are intended to be included within the scope of the present disclosure.

The invention claimed is:

1. A display device comprising:
a display panel;
a front cover including a front part shielding an edge area of a front surface of the display panel and a side part shielding a side surface of the display panel, a mounting hole being formed on the side part;
a guide panel positioned between the display panel and the front cover and supporting the side surface of the display panel;
a backlight unit positioned at a rear surface of the display panel;
a frame positioned at a rear surface of the backlight unit; and
an infrared sensor inserted into the mounting hole,
wherein the guide panel includes a sliding groove for accommodating a portion of the infrared sensor that protrudes toward the guide panel.

2. The display device of claim 1, wherein a width of the mounting hole in a first direction is greater than a width of the infrared sensor in the first direction,
wherein the first direction is a thickness direction of the display device.

3. The display device of claim 1, wherein a width of the mounting hole in a first direction is equal to a width of the infrared sensor in the first direction,
wherein the first direction is a thickness direction of the display device.

4. The display device of claim 1, wherein the infrared sensor is inserted into the mounting hole and slidingly moves so as to be in contact with the front part.

5. The display device of claim 1, wherein the mounting hole is formed to be extended to the front part.

6. The display device of claim 1, wherein the side part includes:
a side front portion adjacent to a front surface of the display device; and
a side rear portion positioned in a rear of the side front portion,
wherein the side front portion more protrudes to an outside of the display device by a predetermined interval than the side rear portion.

7. The display device of claim 1, wherein the infrared sensor includes:
a substrate on which a circuit pattern is formed;
a cover shielding the substrate; and
an infrared lens positioned on at least a portion of a front surface of the cover.

8. The display device of claim 7, wherein the front cover includes a lens hole formed in a portion corresponding to the infrared lens on the front part.

9. The display device of claim 7, wherein the cover includes:
a first portion constituting a front surface of the cover; and
a second portion extended to a rear of the first portion, and
wherein the second portion is higher than the first portion by a predetermined length from a bottom surface.

10. The display device of claim 7, wherein the cover includes:
a first portion constituting a front surface of the cover; and
a second portion extended to a rear of the first portion, and
wherein the second portion is in contact with the front part.

11. The display device of claim 1, wherein the infrared sensor is positioned on the guide panel.

12. The display device of claim 1, wherein the sliding groove is extended in a front direction of the display device.

13. The display device of claim 1, wherein the guide panel includes a fixing groove for fixing the infrared sensor to the guide panel.

14. The display device of claim 1, further comprising a middle cover covering at least a portion of a side surface and a rear surface of the frame,
wherein the middle cover covers the side part of the front cover and at least a portion of the infrared sensor.

* * * * *